(12) United States Patent
Ignatowicz

(10) Patent No.: US 7,364,355 B2
(45) Date of Patent: Apr. 29, 2008

(54) METHOD AND APPARATUS FOR OBTAINING A TEMPERATURE MEASUREMENT USING AN INGAAS DETECTOR

(75) Inventor: Steven Ignatowicz, Grayslake, IL (US)

(73) Assignee: Ircon, Inc., Niles, IL (US)

( * ) Notice: Subject to any disclaimer, the term of this patent is extended or adjusted under 35 U.S.C. 154(b) by 0 days.

(21) Appl. No.: 11/165,006

(22) Filed: Jun. 23, 2005

(65) Prior Publication Data

US 2005/0286608 A1 Dec. 29, 2005

Related U.S. Application Data

(60) Provisional application No. 60/582,699, filed on Jun. 24, 2004.

(51) Int. Cl.
*G01J 5/10* (2006.01)
*G01J 5/26* (2006.01)

(52) U.S. Cl. .............. 374/121; 374/2; 374/130; 250/339.02

(58) Field of Classification Search ........ 374/120, 374/121, 1–2, 126, 130, 141; 250/338.1, 250/339.07, 339.09, 339.02, 339.04
See application file for complete search history.

(56) References Cited

U.S. PATENT DOCUMENTS

| | | | | |
|---|---|---|---|---|
| 4,408,903 A * | 10/1983 | Baldasarri | ............... | 374/121 |
| 4,647,775 A * | 3/1987 | Stein | ............... | 250/338.1 |
| 4,986,672 A * | 1/1991 | Beynon | ............... | 374/131 |
| 5,094,544 A | 3/1992 | Ignatowicz | | |
| 5,315,538 A * | 5/1994 | Borrell et al. | ............... | 702/189 |
| 5,568,978 A * | 10/1996 | Johnson et al. | ............... | 374/161 |
| 5,666,956 A * | 9/1997 | Buchert | ............... | 600/473 |
| 5,756,992 A * | 5/1998 | Spindler | ............... | 250/252.1 |
| 5,823,681 A * | 10/1998 | Cabib et al. | ............... | 374/126 |
| 6,225,620 B1 * | 5/2001 | Campbell et al. | ............... | 250/221 |
| 6,349,270 B1 * | 2/2002 | Gurary et al. | ............... | 702/134 |
| 6,375,350 B1 * | 4/2002 | Stein | ............... | 374/126 |
| 6,735,557 B1 * | 5/2004 | Castellar et al. | ............... | 703/5 |
| 6,862,549 B1 * | 3/2005 | Palfenier et al. | ............... | 702/134 |
| 6,873,282 B1 * | 3/2005 | Murphy | ............... | 341/164 |
| 2003/0216720 A1 * | 11/2003 | Sinofsky | ............... | 606/11 |
| 2004/0179575 A1 * | 9/2004 | Markham | ............... | 374/121 |
| 2005/0063453 A1 * | 3/2005 | Camm et al. | ............... | 374/161 |
| 2005/0182597 A1 * | 8/2005 | Hilliard | ............... | 702/182 |
| 2007/0034776 A1 * | 2/2007 | Weber et al. | ............... | 250/206 |

OTHER PUBLICATIONS

International Search Report from PCT/US2005/22393 (7 pages).
Written Opinion from PCT/US2005/22393 (6 pages).
Richards, Austin, "Near-IR focal-plane arrays improve camera performance," Compound Semiconductor, Mar. 2003. (XP-002355760).
XenICs, "XEVA-USB Fully digital, software configurable camera Imaging system for TE-cooled InGaAs Photodiode Arrays," www.XenICs.com, Jul. 2003. (XP-002355759).

* cited by examiner

*Primary Examiner*—Gail Verbitsky
(74) *Attorney, Agent, or Firm*—Marshall, Gerstein & Borun LLP

(57) ABSTRACT

A method of linearizing the output a infrared camera having an InGaAs includes determining the an equivalent black body temperature of an object by utilizing a plurality of calibration constants determined by collecting data from a number of temperatures of the object, and determining a target temperature of the object by utilizing the equivalent black body temperature and the emissivity of the object.

11 Claims, 4 Drawing Sheets

US 7,364,355 B2

METHOD AND APPARATUS FOR OBTAINING A TEMPERATURE MEASUREMENT USING AN INGAAS DETECTOR

RELATED APPLICATION DATA

The present application is a non-provisional application based on co-pending provisional application 60/582,699, which was filed on Jun. 24, 2004, and is incorporated herein by reference for all purposes.

FIELD OF THE DISCLOSURE

The present disclosure is generally directed to method and apparatus for linearizing the output an infrared camera and, more particularly, a method and apparatus for obtaining a temperature measurement using for an InGaAs detector.

BACKGROUND OF THE DISCLOSURE

Thermal imaging cameras were originally used to sense heat or aid night vision. For vision applications there was no need for absolute temperature measurement. As these cameras started being used for process control, however, manufacturers started making cameras with absolute temperature measurement capabilities. Using the same conversion schemes used by spot infrared pyrometer manufacturers, camera manufacturers built in schemes to provide actual temperature measurements. They counted on the output of the detector to follow Planck's equation when looking at black body targets.

As the use of thermal imaging cameras progressed, imaging cameras were being used in new applications requiring a faster detector response and cameras able to handle higher temperature ranges. These higher temperature ranges and faster response times, however, are not suited for traditional infrared pyrometer detectors due to their slow response times and low temperature thresholds. In contrast, a thermal imager with an InGaAs detector does have a quick response time and is suitable for higher temperature ranges.

The InGaAs detector array integration readout circuitry, however, creates a non-linearity so that the output does not follow the predicted Planck curve. Further, since real targets are not black bodies, it is necessary to compensate the detector output with an emissivity correction that is accomplished when the output tracks the Planck curve. When it does not, as is the case with the InGaAs array and its associated readout circuitry, correcting for emissivity is a complicated matter which prior to now was not been adequately resolved.

BRIEF DESCRIPTION OF THE DRAWINGS

Objects, features, and advantages of the present device will become apparent upon reading the following description in conjunction with the drawing figures, in which.

Figure 1:
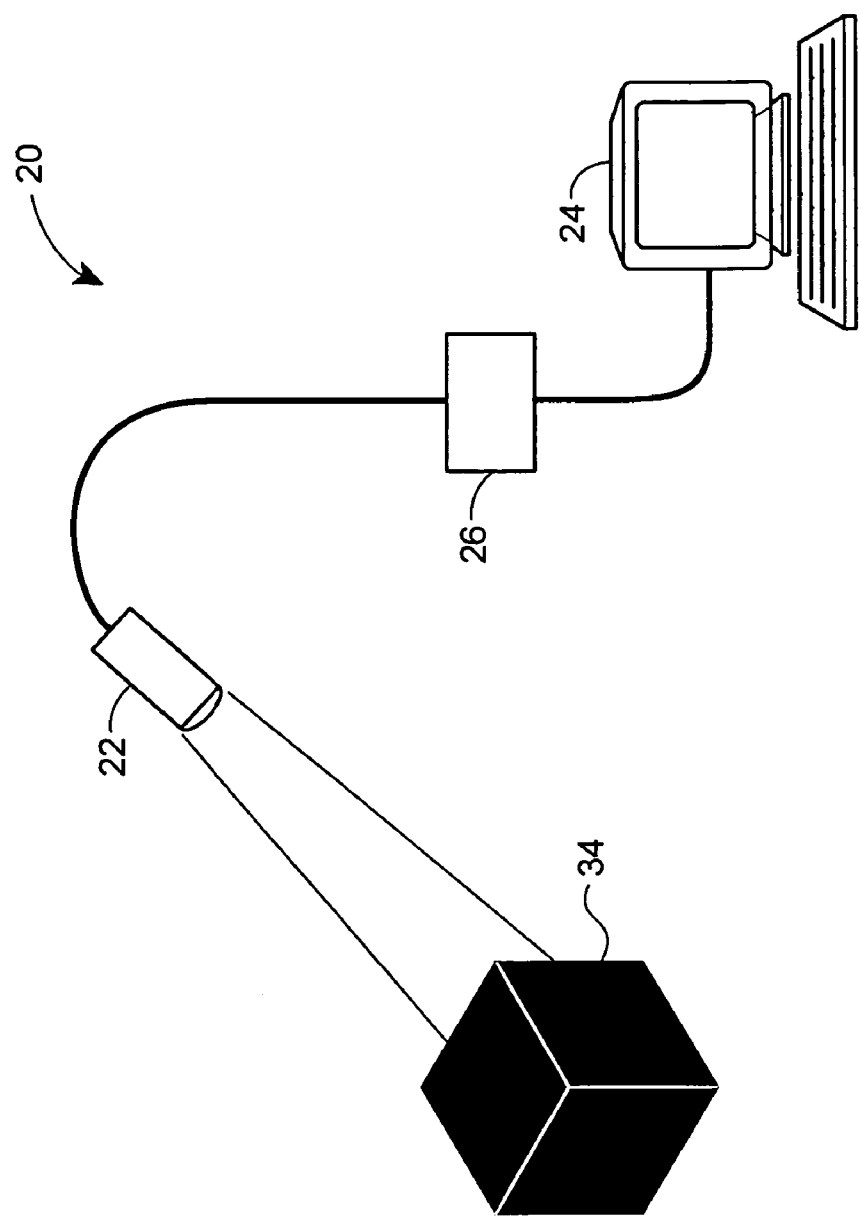
FIG. 1 is an isometric view of one example of an apparatus for linearizing the output a infrared camera constructed according to one embodiment of the disclosure.

While the method and device described herein are susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the disclosure and the appended claims.

DETAILED DESCRIPTION OF THE DISCLOSURE

Referring now to the drawings, and with specific reference to FIG. 1, an infrared camera linearization apparatus for linearizing the output of an infrared camera, such as an InGaAs detector based infrared camera as constructed in accordance with the teachings of the disclosure is generally depicted by reference numeral 20. As shown therein, the infrared camera linearization apparatus may include an thermal camera 22 having an indium gallium arsenide detector (InGaAs detector) (FIG. 2) operatively connected to a programmable device 24 such as a Personal Computer (PC), microprocessor or controller, and a digital frame grabber 26. The method and apparatus for linearizing the output of an infrared camera may function both as an integral part of the camera output or as a post processing function in the separate computing device. As such, the controller 24 may be disposed outside the cameras 22 as seen in FIGS. 1 and 2, or may be disposed inside the camera (FIG. 2 shown in dashed lines).

Figure 2:
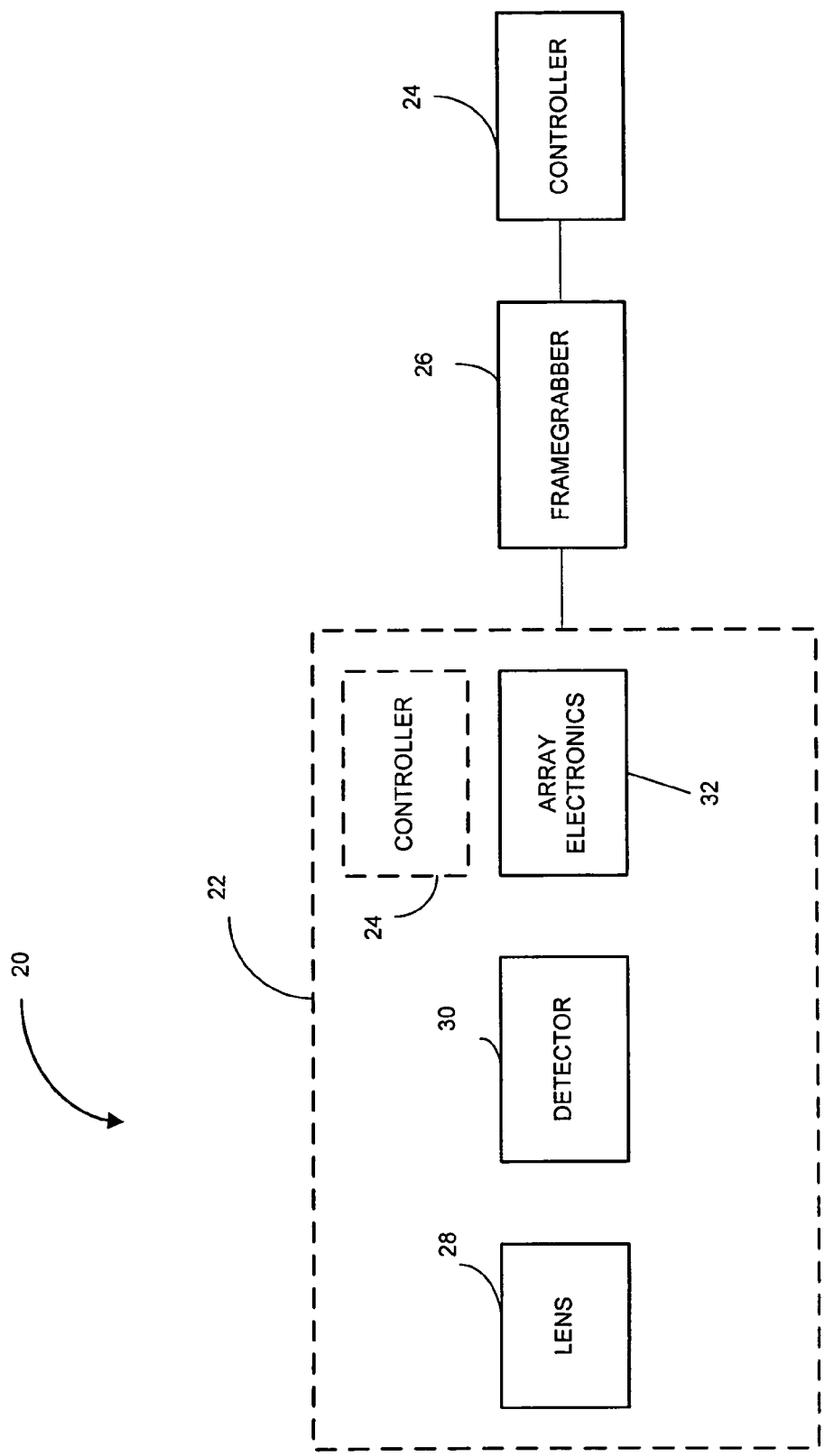
FIG. 2 is a block diagram of the apparatus of FIG. 1.

As illustrated in FIG. 2, the camera 22 includes a lens 28 operatively connected to a detector or detector array 30. The lens 28 optically compresses and guides a thermal image of an object onto the detector or detector array 30. A typical InGaAs array 30 has a video format of 320×256 pixels but other array designs could use other formats, including but not limited to, 640×480 and 160×120. The array 30 is operatively connected to a plurality of array electronics 32 that convert the information in each piece of the array to an electronic signal. The array 30 may also have a variable integration time that determines or sets the amount of time it takes for the thermal image to be integrated on the detectors 30. This time may vary greatly, and may include a range four to eleven microseconds. The electronic signal from each piece of the array is then represented by corresponding pixels. The method of linearization does not depend on the size of the array.

In one exemplary embodiment, the detector output is digitized with the results filling a block of memory either inside the camera or in the PC through the digital frame grabber 26. The frame grabber 26 for capturing numerous thermal images may be communicably disposed between the controller 24 and the imager 22. The frame grabber 26 may be used to digitize and/or store video information into a bitmap image, for example. Frame grabbers can be stand-alone units or may be a function built into a video graphics boards in the camera 22.

InGaAs detectors 30, as is the case with other detectors, have a minimum sensitivity level. That is, infrared energy striking the detector 30 must be above a certain level before the detector output will start tracking the energy. It has been determined that the detector output at the point where it begins sensing energy is important in a successful linearization strategy. By subtracting this detection threshold level from the detector output looking at higher energy targets, the resultant value can be converted to a black body equivalent temperature. For example, $$T_{BB}=C0+C1*(ADC-\text{MinThreshold})+C2*\text{Sqrt}(ADC-\text{MinThreshold})+C3*(ADC-\text{MinThreshold})^{1.5}$$

Where $T_{BB}$ is the equivalent black body temperature;
C0 is a calibration constant;
C1 is a calibration constant;
C2 is a calibration constant;
C3 is a calibration constant;
ADC is the digitized detector output; and
MinThreshold is the ADC value where the detector output begins to change.

The calibration constants are determined by collecting data from a number of target temperatures and then using curve fitting techniques on the data.

In a practical system the equation would be evaluated for every possible ADC value and the results would be stored in a lookup table in a form so that no precalculation is needed for fast conversion to temperature. Now to make the scheme complete it is necessary to incorporate the emissivity factor in the process.

The output of a gray body is just reduced by a constant factor from a black body. The equivalent Planck conforming detector output is computed as:

$$DetADC=\text{Emissivity}*\text{Planck}(T_{BB})$$

Ordinarily then the Target temperature would be computed from:

$$T_{BB}=\text{Planck}^{-1}(DetADC/\text{Emissivity})$$

However, since the DetADC is not linear a more complex equation is needed to compute temperature:

$$T_{Target}=\text{Planck}^{-1}(\text{Planck}(T_{BB})/\text{Emissivity}))$$

So if the equations are combined the following gives the formula for generating the lookup table:

$$T_{Target}=\text{Planck}^{-1}(\text{Planck}(C0+C1*(ADC-\text{MinThreshold})+C2*\text{Sqrt}(ADC-\text{MinThreshold})+C3*(ADC-\text{MinThreshold})^{1.5})/\text{Emissivity}))$$

Figure 3:
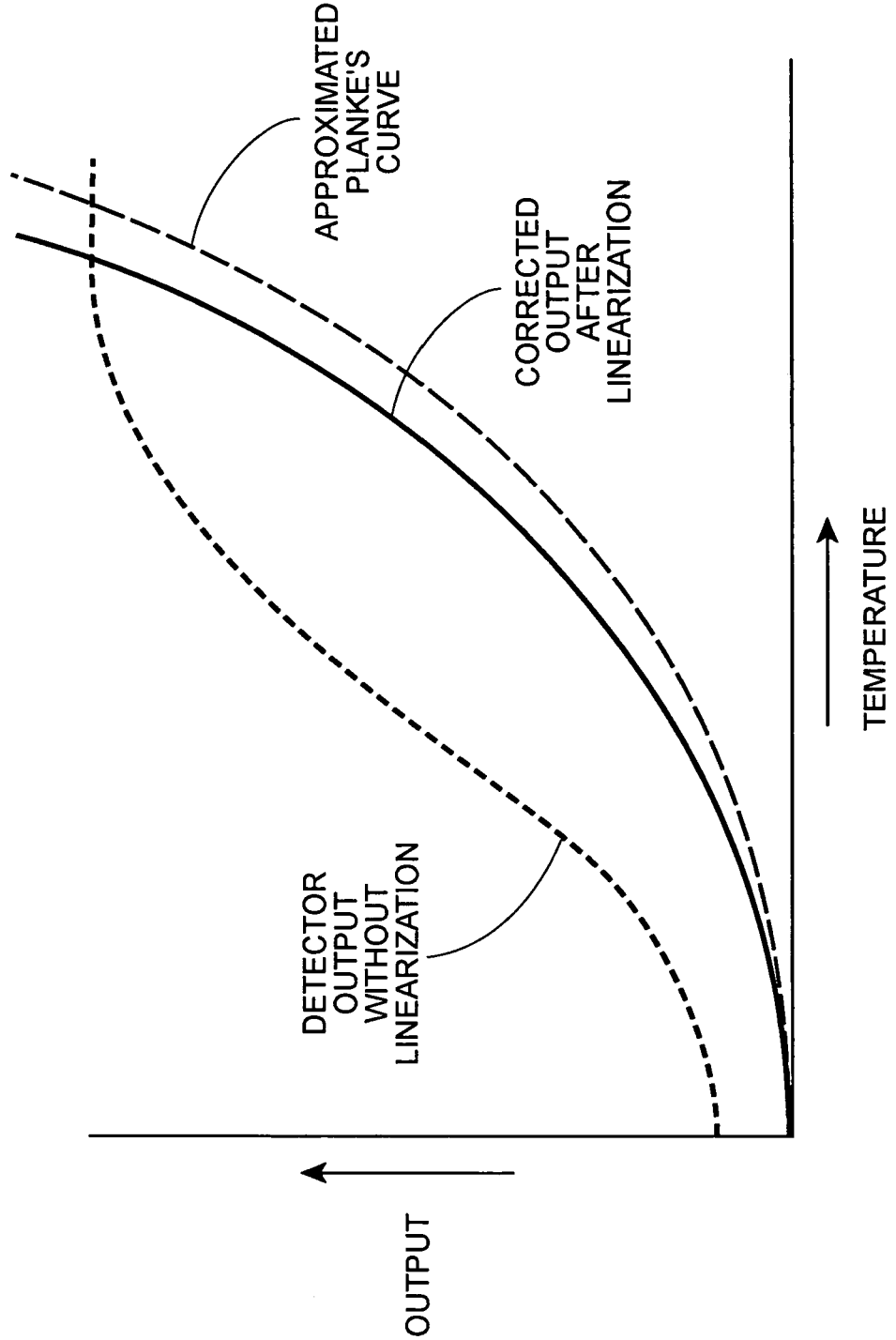
FIG. 3 is a graph depicting the effects of linearization techniques as provided by the apparatus of FIG. 1.

Therefore, an improved Radiometric InGaAs Imaging Camera is obtained by implementing the linearization scheme described above. More specifically, in one embodiment, as seen in FIG. 3, wherein the output of an infrared camera both before and after linearization is depicted, a better or optimized curve may be obtained.

In operation, as seen in FIG. 1, the camera 22 may be placed relative to a high temperature falling object 34, such as molten glass falling under gravity for example. The temperature and speed of the object at which the InGaAs detector 30 accurately captures the thermal image of the object 34 is less than 50 feet per second and greater than 200 degrees Celsius. The camera 22 may, however, may be utilized to obtain temperatures of other types of moving objects that do not pass through the field of view of the camera, but are fixed within it. For example, blades of a fan are moving but remain in the field of view of the camera 22. With a proper integration time setting, such as four microseconds for example, the camera 22 may capture the thermal image of a fan blade rotating at 30,000 revolution per minute.

Figure 4:
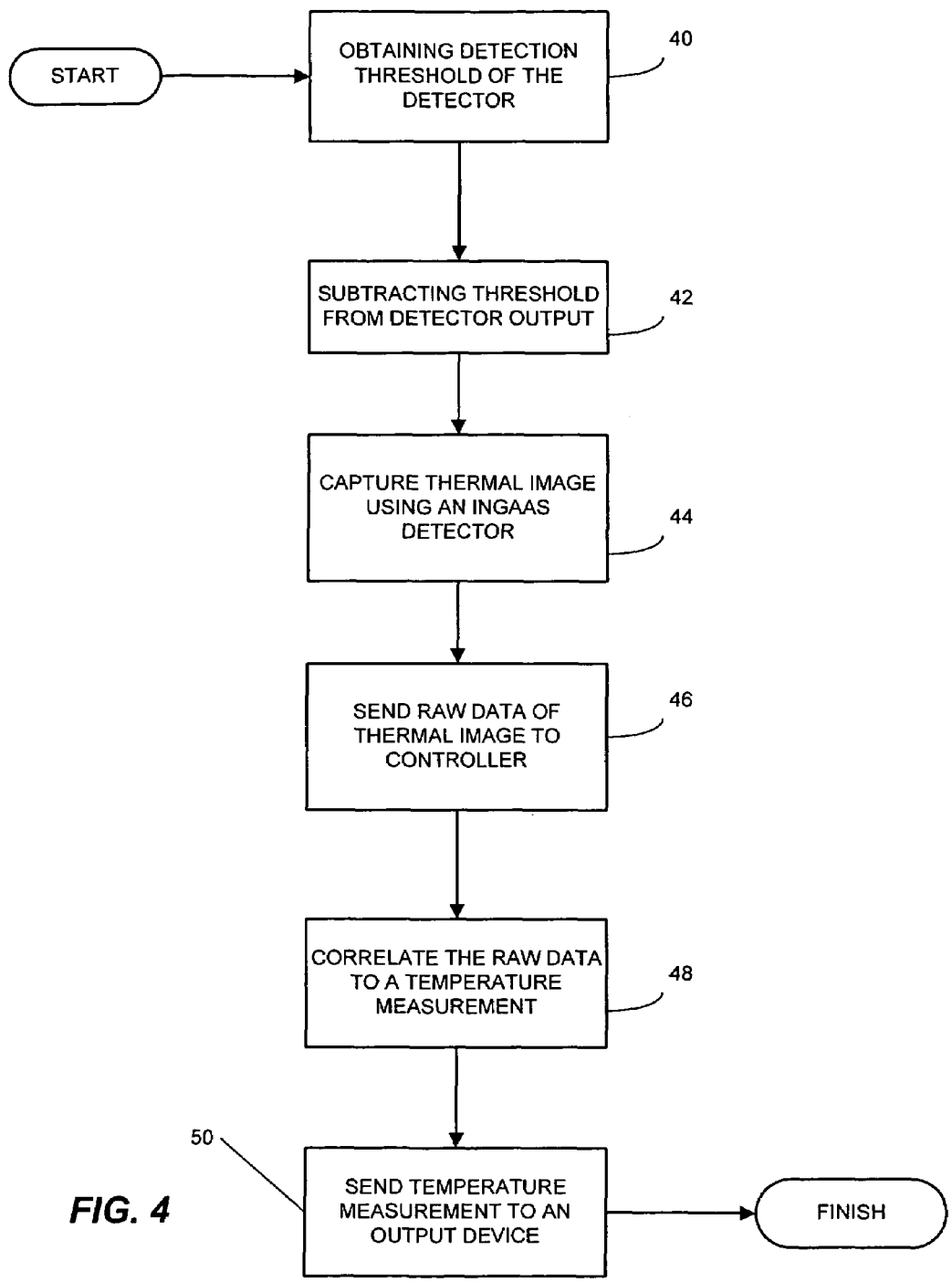
FIG. 4 is a block diagram of a method for obtaining a temperature measurement using the apparatus of FIG. 1.

Prior to capturing a thermal image for use in temperature measurements, the camera 22 or detector 30 may be adjusted according to its minimum sensitivity level. Accordingly, at block 40, as illustrated in FIG. 4, the threshold of the detector 30 may be obtained by subjecting the detector 30 to infrared energy—a heated object—and determining the level of energy at which the detector 30 will start tracking. This threshold energy may then be subtracted from the detector output at block 42.

The thermal image of the falling object 34 is captured at block 44 with the InGaAs detector 30. The electrical signal or raw thermal data of the thermal image is then communicated to the controller 24 at block 46. At block 48 the electrical signal or raw thermal data is then converted to a temperature measurement by the controller 24, which is programmed to receive and correct the non-linear signal from the detector 30 with an emissivity correction that then tracks the Planck curve. At block 50, the converted temperature measurement is then sent to an output device, such as for example, an alarm, monitor, gauge, controller, etc.

In other words, thermal data may be collected from an object, which is then used to determine an equivalent black body temperature of the object by utilizing a plurality of calibration constants. An absolute or true temperature of the object may be obtained by utilizing an equivalent black body temperature and an emissivity of the object.

Although certain embodiments of a method and apparatus for linearizing the output of an infrared camera have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. An apparatus for measuring temperature of an object using an InGaAs detector, comprising:
   a camera having a lens for viewing a thermal image;
   an InGaAs detector array for receiving the thermal image from the lens;
   electronics for conveying thermal image data from the detector array into a usable electrical signal; and
   a controller programmed to convert the electrical signal into a temperature measurement, wherein conveying the electrical signal into a temperature measurement comprises:
   obtaining a detection threshold level of the InGaAs detector array indicative of an energy level at which the detector begins sensing incident energy; and
   generating the temperature measurement by applying the formula $$T_{target}=\text{Planck}^{-1}(\text{Planck}(C0-C1(ADC-\text{MinThreshold})+C2\sqrt{(ADC-\text{MinThreshold})}+C3(ADC-\text{MinThreshold})^{3/2}/\text{Emmissivity}));$$

wherein C0, C1, C2 and C3 are calibration constants,
Planck is the Plank function,
ADC is an InGaAs detector array output,
MinThreshold is a detection threshold level of the InGaAs detector array indicative of an energy level at which the detector begins sensing incident energy, and
Emmissivity is the emmissivity of the measured object.

2. The apparatus of claim 1, wherein the detector array has a video format of at least one of 160×120, 640×430, or 320×256 pixels.

3. The apparatus of claim 1, wherein the controller is disposed inside the camera.

4. The apparatus of claim 1, further including a digital frame grabber communicably coupled to the controller.

5. The method of claim 1, further comprising:
   generating a look-up table for a plurality of usable electrical signals by applying the formula; and
   storing the look-up table in the controller.

6. A method of measuring temperature using an InGaAs detector, comprising:
   collecting data from a number of temperatures of an object;

determining an equivalent black body temperature of the object by utilizing a plurality of calibration constants; and determining a temperature of the object in accordance with the formula:

$$T_{target} = \text{Planck}^{-1}(\text{Planck}(C0 - C1(ADC - \text{MinThreshold}) + C2\sqrt{(ADC - \text{MinThreshold})} + C3(ADC - \text{MinThreshold})^{3/2}/\text{Emmissivity}));$$

wherein C0, C1, C2, and C3 are calibration constants,
Planek is the Plank function,
ADC is an InGaAs detector array output,
MinThreshold is a detection threshold level of the InGaAs detector array indicative of an energy level at which the detector begins sensing incident energy, and
Emmissivity is the emmissivity of the measured object; and communicating the temperature measurement to an output device, wherein the output device is adapted to communicate the temperature measurement to a user.

7. The method of claim 6, wherein collecting data includes capturing the thermal image of an object having a temperature greater than 200 degrees Celsius.

8. The method of claim 6, wherein collecting data includes capturing a thermal image of an object moving less than 50 feet per second.

9. The method of claim 6, wherein collecting data includes capturing a thermal image of an object moving at 32.2 feet per second.

10. The method of claim 6, wherein collecting data includes setting an integration time of the thermal camera to allow capturing a thermal image of an object rotating at approximately 30,000 revolution per minute.

11. The method of claim 10, further including setting an integration time of the InGaAs detector between four and eleven microseconds.

* * * * *

UNITED STATES PATENT AND TRADEMARK OFFICE
CERTIFICATE OF CORRECTION

PATENT NO. : 7,364,355 B2
APPLICATION NO. : 11/165006
DATED : April 29, 2008
INVENTOR(S) : Steven Ignatowicz It is certified that error appears in the above-identified patent and that said Letters Patent is hereby corrected as shown below:

On the Title Page

In the Abstract, Item (57), line 1, "output a infrared" should be -- output of an infrared --.

In the Abstract, Item (57), line 2, "an InGaAs includes" should be -- an InGaAs detector includes --.

In the Abstract, Item (57), line 2, "the an equivalent" should be -- an equivalent --.

At Column 4, line 34, "convening" should be -- converting --.

At Column 5, line 10, "Planek" should be -- Planck --.

At Column 5, line 10, "Plank" should be -- Planck --.

Signed and Sealed this

Twenty-third Day of September, 2008

JON W. DUDAS
*Director of the United States Patent and Trademark Office*